United States Patent

Yu

[11] Patent Number: 5,356,061
[45] Date of Patent: Oct. 18, 1994

[54] ARTICLE ARRANGING FRAME FOR MOUNTING ON VEHICLE SEAT BACK

[76] Inventor: Yung-Nan Yu, 8F, No. 86, Sec. 1, Hsinsheng N. Road, Taipei, Taiwan

[21] Appl. No.: 137,306
[22] Filed: Oct. 15, 1993
[51] Int. Cl.⁵ ............................................. B60R 7/00
[52] U.S. Cl. .................................. 224/275; 224/282; 224/42.39; 224/42.46 R; 211/106; 297/191
[58] Field of Search ............ 224/273, 275, 279, 42.39, 224/42.46 R, 42.45 R, 42.46 B, 324, 318; 297/191, 254, 255; 211/75, 85, 106, 119, 118, 189; 4/559; 1/605

[56] References Cited

U.S. PATENT DOCUMENTS

| | | | |
|---|---|---|---|
| 2,659,420 | 11/1953 | Burke | 297/191 |
| 2,884,174 | 4/1959 | Davitt | 224/42.46 R |
| 2,887,216 | 5/1959 | Hargraves | 224/42.46 R |
| 3,268,133 | 8/1966 | McAnallen | 224/275 |
| 4,842,230 | 6/1989 | Cobb et al. | 211/106 |

*Primary Examiner*—Henry J. Recla
*Assistant Examiner*—Steven O. Douglas
*Attorney, Agent, or Firm*—Poms, Smith, Lande & Rose

[57] ABSTRACT

An article arranging frame includes a rectangular main frame with a number of bars extending parallel with the side edges thereof and interconnected with each other. A pair of hook-like hangers mount the main frame to a vehicle seat back to allow flexible strips which are releasably attached to the main frame to hold articles on the main frame. Bags with opening are also provided on the main frame to receive and hold therein articles which may not be suitable for being secured by the flexible strips.

5 Claims, 3 Drawing Sheets

ARTICLE ARRANGING FRAME FOR MOUNTING ON VEHICLE SEAT BACK

FIELD OF THE INVENTION

The present invention relates generally to an article arranging frame and in particular to an article arranging frame for mounting on a vehicle seat back.

BACKGROUND OF THE INVENTION

Nowadays, vehicles, especially passenger cars, are a common and useful transportation means, A comfortable and snug interior decoration of the vehicles may allow a more efficient utilization of the vehicle interior space. Currently, article arranging devices for use inside vehicles are, in general, designed for the drivers, not for passengers sitting on the back side seat. It is often that the articles are randomly placed everywhere around the back side seat of the vehicle, causing a big mass on the back side of the vehicle.

It is therefore desirable to provide an article arranging frame for mounting on vehicle seat back to allow a back side passenger to dispose and arrange articles thereon so as to overcome the problem of random disposition of article on the back side seat of a vehicle.

SUMMARY OF THE INVENTION

It is therefore the principal objective of the present invention to provide an article arranging frame for mounting on vehicle seat back comprising a rectangular main frame releasably secured on the vehicle seat back by hook-like hangers on which flexible strips are attached to secure articles on the main frame by the restoring force thereof.

It is also an objective of the present invention to provide an article arranging frame for mounting on vehicle seat back comprising article storing bags mounted on the main frame for receiving therein articles the bags being used alternatively or in combination with the flexible strips.

To achieve the above objective, there is provided an article arranging frame for mounting on vehicle seat back comprising a rectangular main frame with a number of bars extending parallel with thereof and the side edges interconnected with each other. A pair of hook-like hangers mount the main frame to the vehicle seat back to allow flexible strips which are releasably attached to the main frame to hold articles on the main frame. Bags with opening are also provided on the main frame to receive and hold therein articles which may not be suitable for being secured by the flexible strips.

BRIEF DESCRIPTION OF THE DRAWINGS

The present invention will be better understood from the following description of preferred embodiments of the present invention, with reference to the attached drawings, wherein.

DETAILED DESCRIPTION OF THE PREFERRED EMBODIMENTS

Figure 1:
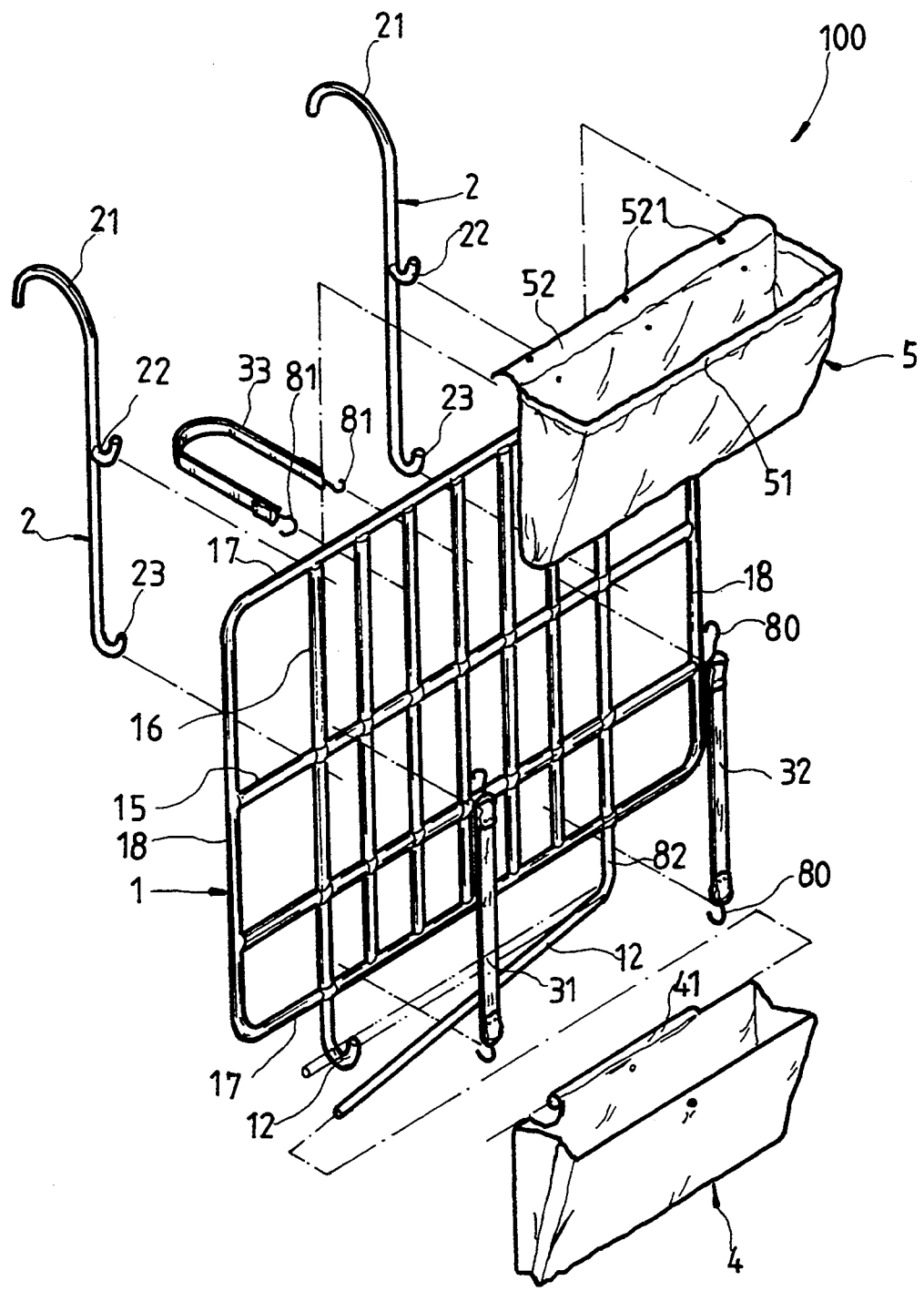
FIG. 1 is an exploded perspective view showing an article arranging frame constructed in accordance with the present invention.

With reference to the drawings and in particular to FIG. 1, wherein an article arranging frame for mounting on a vehicle seat back constructed in accordance with the present invention, generally designated by the reference numeral 100, is shown, the article arranging frame 100 comprises a main frame 1 having a number of bar members 15 and 16 disposed and secured therein and interconnected with each other to form a net-like structure. Preferably, the main frame 1 is a rectangular frame having two parallel and opposite horizontal edge bars 17 and two parallel and opposite vertical edge bars 18 with the bar members 15 extending parallel with the horizontal edge bars 17 and the bar members 16 extending parallel with the vertical edge bars 18.

The terms "horizontal" and "vertical" used herein merely refer to two directions substantially mutual perpendicular and which are preferably the horizontal and vertical when the main frame 1 is mounted to a vehicle seat back in a normal condition.

A pair of hook-like hanger members 2 are provided to mount the main frame 1 to the vehicle seat back (not shown). Each of the hanger members 2 is in the form of an elongated bar having a first end bent to form a first hook 21 for hooking on the vehicle seat (not shown) and a second end bent in an opposite direction to form a second hook 23 which may be smaller than the first hook 21 to allow the main frame 1 to be hung thereon.

There is also provided at a middle position of each of the hanger bars 2 a third hook 22 similar to the second hook 23 to provide an alternative position for hanging the main frame 1.

To secure articles on the main frame 1, article holding means are provided, comprising a pair of elongated flexible strips, first strip 31 and second strip 32, releasably secured on the main frame 1 to extend substantially vertically. The first and second flexible strips 31 and 32 are expandable to allow a first article, such as a tissue case 6 (see FIG. 2) to be held on the main frame 1. Each of the first and second strips 31 and 32 has two ends with a hook 80 mounted on each of which to hook on one of the bar members 15 and 16 or the edge bars 17 and 18 to releasably secure the first and second strips 31 and 32 on the main frame 1.

The article holding means further comprises a third elongated strip 33 extending horizontally with a hook 81 mounted on each end thereof for releasably securing the third strip 33 on the main frame 1. Similar to the first and second strips 31 and 32, the third strip 33 is expandable to hold articles, such as beverage can 90 and bottle 91, on the main frame 1 (see FIG. 2). The can 90 and the bottle 91 can be advantageously seated on the tissue case 6 as shown in FIG. 2.

A first bag 5 (FIGS. 2 and 3) is provided to hang on the main frame 1. The first bag 5 has an opening with an expandable band 51 secured thereon to hold therein articles which are not suitable for being held by the flexible strips 31, 32 and 33, such as fruit 92 and boxed snack 93. The first bag 5 has a flap 52 extending from an edge of the opening thereof to be folded back around the upper horizontal edge bar 17 to allow a plurality of snaps or buttons 521 that are mounted thereon fastened to secure the first bag 5 on the main frame 1. It is understood that the fasteners used to secure the bag 5 on the main frame 1 can be replaced by other suitable means, such as Velcro strip.

The first bag 5 and the third flexible strip 33 may be used in an alternative manner if the space provided by the main frame 1 is not sufficient for using them at the same time. This is respectively illustrated in FIGS. 2 and 3.

Figure 2:
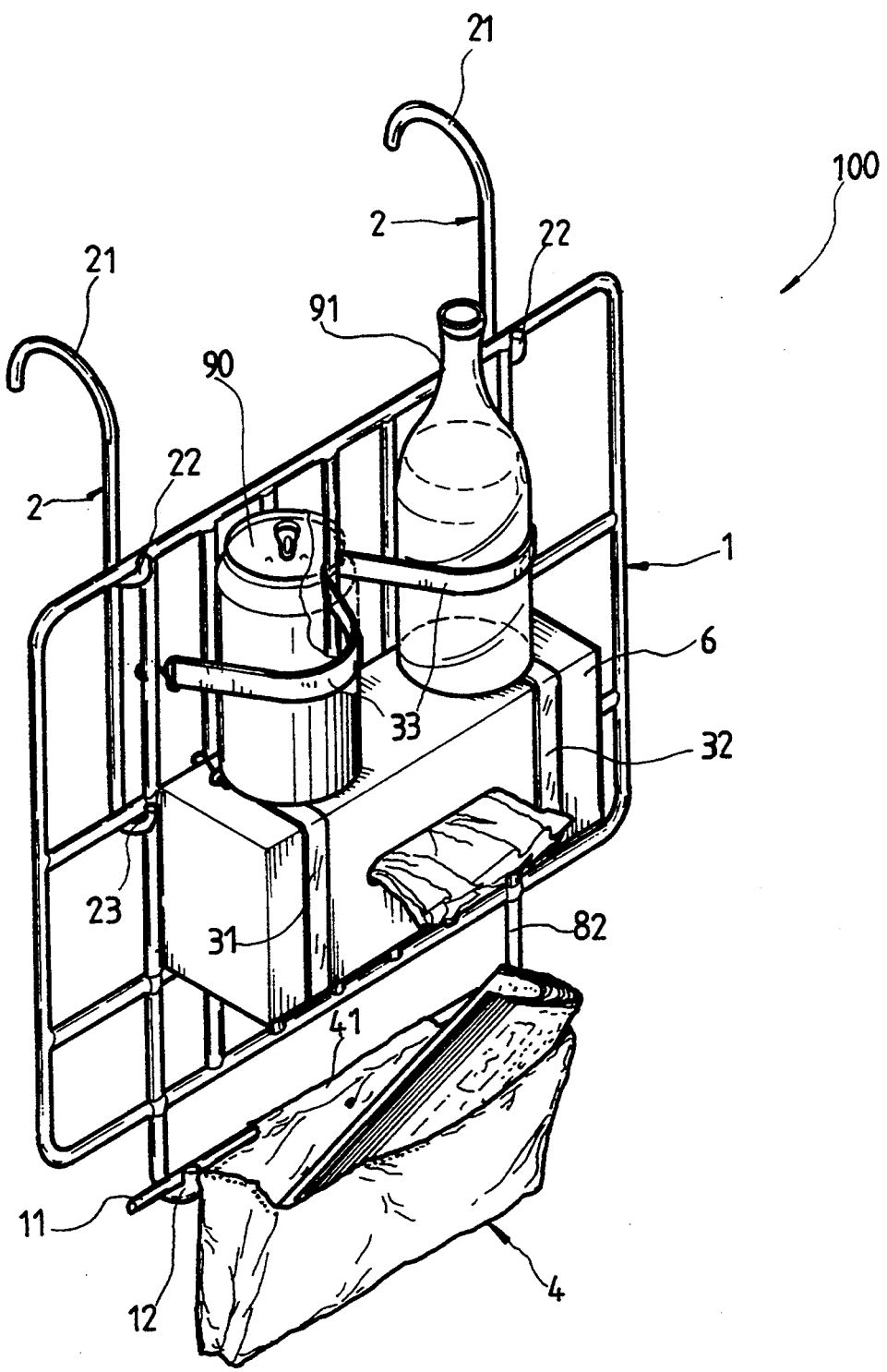
FIG. 2 is a perspective view showing a first embodiment of using the article arranging frame of the present invention.
Figure 3:
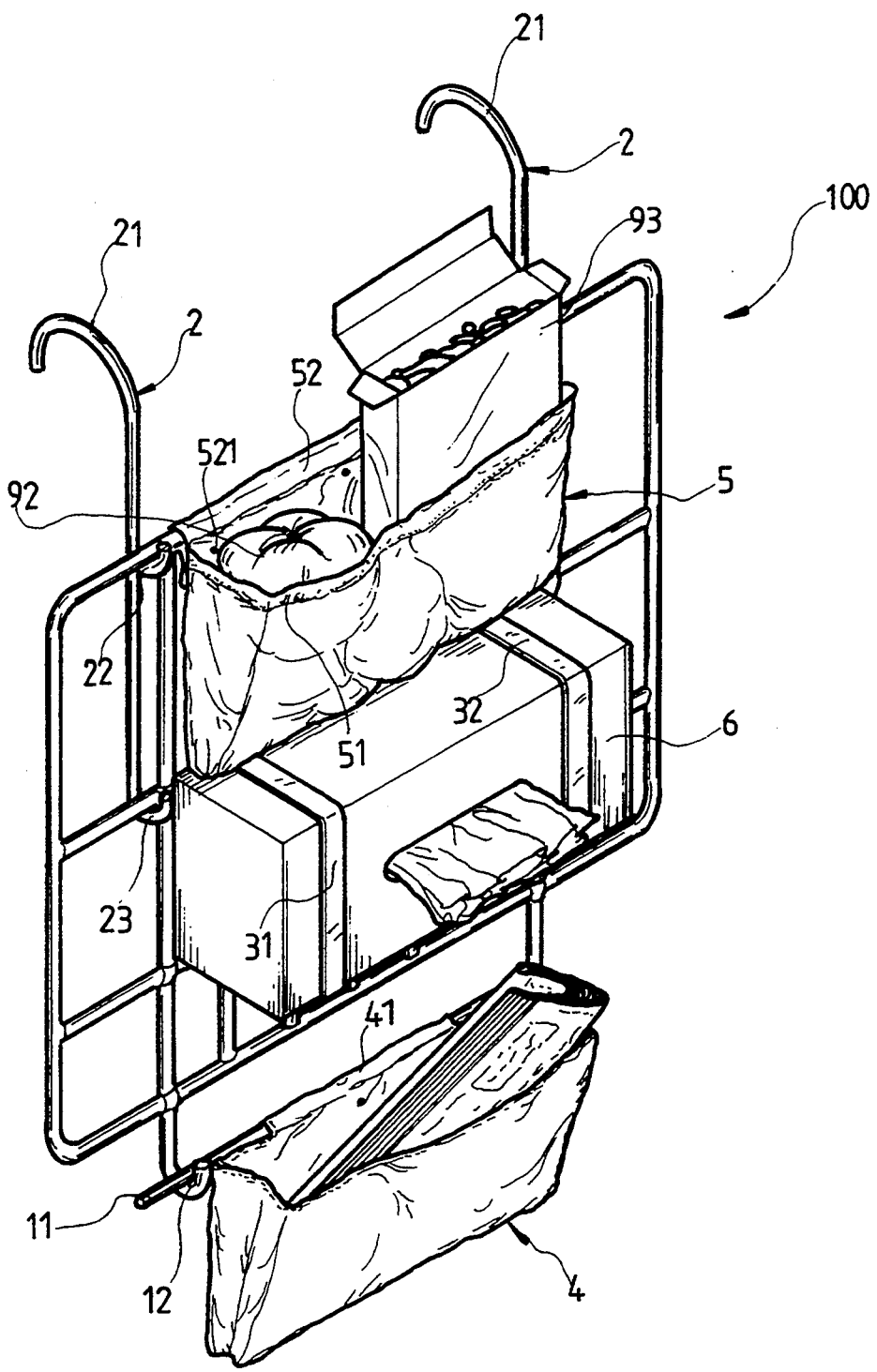
FIG. 3 is a perspective view showing a second embodiment of using the article arranging frame of the present invention.

The article holding means further comprises a second bag 4 which has an opening for receiving therein articles, such as a magazine shown in FIGS. 2 and 3. The second bag 4 has a tubular member 41 fixed on an edge of the opening thereof. A support bar 11 which extends horizontally has a vertical leg 82, extending from an end thereof, normal to and rotatably secured to the bottom horizontal edge bar 17 of the main frame 1 to allow an opposite end of the support bar 11 to be swingable and rotatable relative to the main frame 1 about the vertical leg 82 thereof. A holding hook 12 is mounted to the bottom horizontal edge bar 17 at a suitable location to allow the opposite end of support bar 11 to be received and held therein for securing the support bar 11 to the main frame 1. The second bag 4 is hung on the main frame 1 by having the support bar 11 extend through the tubular member 41 thereof.

It is apparent that al though the invention has been described in connection with the preferred embodiments, it is contemplated that those skilled in the art may make changes to certain features of the preferred embodiments without altering the basic concept of the invention and without departing from the spirit and scope of the invention as defined in the appended claims.

What is claimed is:

1. An article arranging frame for mounting on a vehicle seat back, said article arranging frame comprising:
    a main frame having a first pair and a second pair of parallel edge bars, each pair extending in a horizontal direction and a vertical direction, respectively;
    a plurality of first bars connected to and extending between the second edge bars, parallel with the horizontal direction;
    a plurality of second bars connected to and extending between the first edge bars, parallel with the vertical direction, said second bars being interconnected with said first bars at intersecting points therebetween;
    a pair of hook-like hangers attached to said frame for hanging said main frame on the vehicle seat back;
    a plurality of elongated flexible strips, each having two hooks mounted to ends thereof for releasably attaching the flexible strips to said main frame, wherein at least two of said flexible strips being mounted in parallel with the vertical direction for cooperatively holding an article on said main frame and at least one of said flexible strips being mounted in parallel with the horizontal direction to hold at least an article on said main frame; and
    at least one bag having an upper edge defining an opening for receiving therein at least an article, said bag being mounted to a support bar which is mounted to said main frame in parallel with the horizontal direction and having a leg extending from one end thereof rotatably mounted to said main frame and an opposite free end so as to allow said support bar and thus said bag to be rotatable relative to said main frame about the leg thereof, said bag having a tubular member mounted to the upper edge thereof to be extended over the support bar, an end holder being mounted to said main frame in such a way to releasably receive and hold said opposite end of said support bar therein for holding the support bar stationary relative to the main frame.

2. An article arranging frame as claimed in claim 1, wherein each of said hook-like hangers comprises an elongated bar member having a first end on which a first hook is formed to hang on the vehicle seat back and a second end on which a second hook bent in a direction opposite to the first hook is formed to allow one of said edge bars of said main frame to hang thereon.

3. An article arranging frame as claimed in claim 2, wherein each of said hook-like hangers further comprises a third hook bent substantially similar to said second hook and located at a middle position along the length of said hook-like hanger to provide an alternative position for hanging said main frame thereon.

4. An article arranging frame as claimed in claim 1, further comprising a second bag having an opening with a flexible band portion therearound, said second bag having a flap extending from the opening thereof to be folded back around one of said edge bars of said main frame to allow a plurality of fasteners to secure the flap to said second bag so as to secure said second bag to said one of said edge bars.

5. An article arranging frame as claimed in claim 4, wherein said fasteners comprise buttons.

* * * * *